United States Patent

[11] 3,600,866

| [72] | Inventor | Edward J. Griffith<br>4558 Wentworth Drive, Rapid City, S. Dak. 57701 |
|---|---|---|
| [21] | Appl. No. | 808,771 |
| [22] | Filed | Mar. 20, 1969 |
| [45] | Patented | Aug. 24, 1971 |

[54] PORTABLE GARAGE
5 Claims, 7 Drawing Figs.
[52] U.S. Cl. .................................................. 52/64,
    49/73, 52/125, 52/143, 52/174
[51] Int. Cl. ...................................................... E04h 6/04
[50] Field of Search .......................................... 52/174, 64,
    65, 66, 143, 79, 69, 125; 49/94, 96, 114, 143, 142,
    73; 296/1, 23

[56] References Cited
UNITED STATES PATENTS
2,742,674  4/1956  Melder ........................ 52/64

2,886,394  5/1959  Snyder ........................ 49/73 X
3,438,158  4/1969  Kane .......................... 52/64

Primary Examiner—Price C. Faw, Jr.
Attorneys—Clarence A. O'Brien and Harvey B. Jacobson ABSTRACT: A portable garage for trailer camp and similar use having a bottom firmly supportable atop a suitably flat foundation. It comprises a walled enclosure having a main hinged door at its entrance-exit end, one or more auxiliary sidewall doors, and a linking connection whereby all doors are simultaneously openable and closable. The driver leaves and subsequently reenters the enclosed automobile by way of the sidewall door or doors. The floor-forming bottom is equipped with guide rails and bordering trackways for centering and positioning the automobile. The projecting forward end of the rail means is fashioned into a towing bracket equipped with trailer-type coupling means. Attachable and detachable dolly wheels are installed when the garage is hitched to a towing car for traveling.

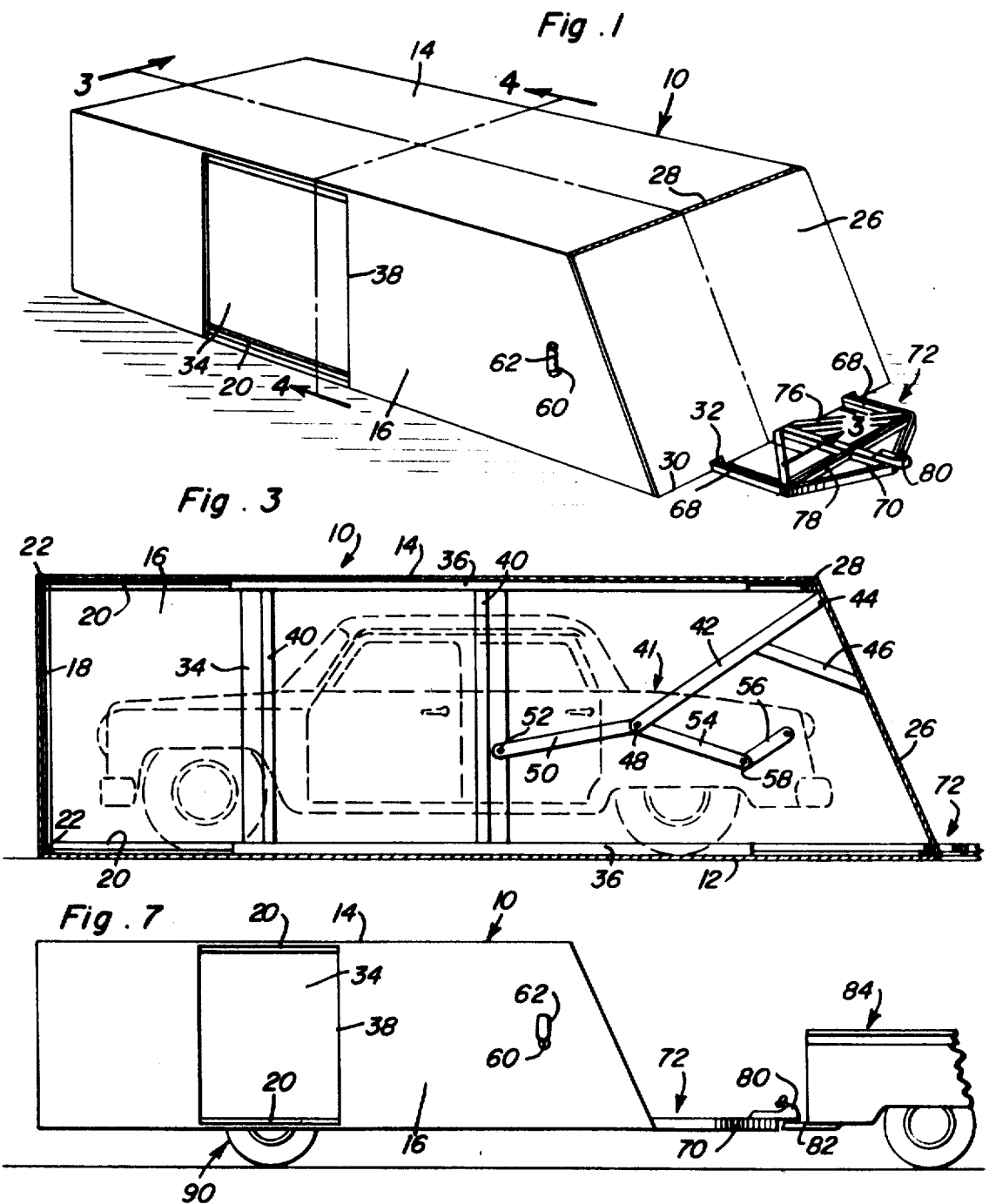

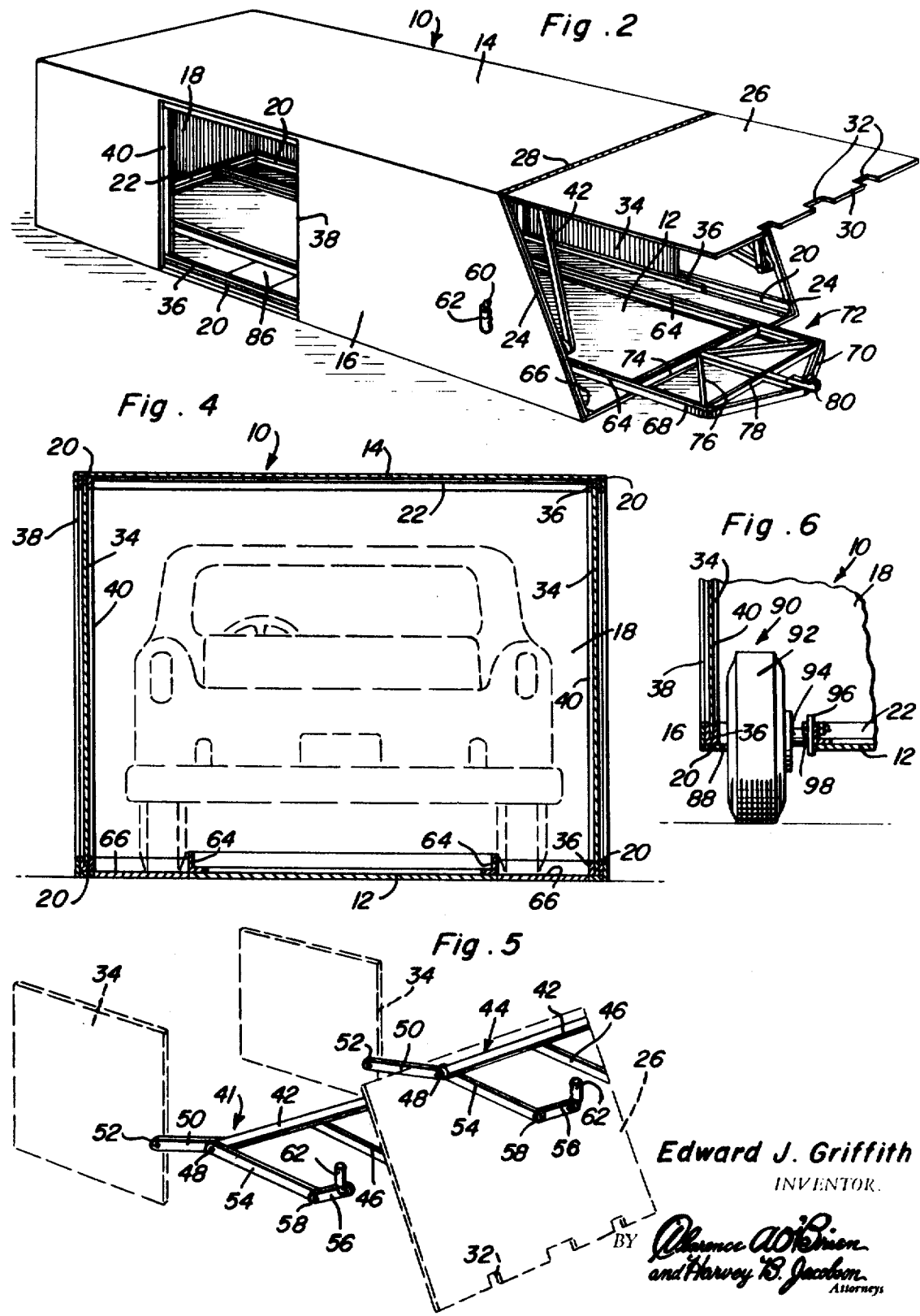

PORTABLE GARAGE

The present invention relates to a portable garage which is designed and adapted for campsite and trailer camp use and which is characterized, generally stated, by a walled enclosure having a front door and selectively usable side doors, a firm bottom wall constituting a floor and which features fixed interior wheel guiding and parking means and wherein said enclosure is constructed to accommodate quick attachable and detachable dolly-type wheels which are preferably removed at the trailer camp but are subsequently mounted for use when the user desires to leave camp and travel from place to place.

An object of the invention, broadly stated, is to provide a simple, practical, economical and versatile garage in which the owner's automobile can be parked and protectively enclosed, which expedites the step of driving reliably into the enclosing space or housing, and which also serves the many purposes for which it has been devised for reliable and expeditious use.

Briefly, the preferred embodiment of the invention comprises an elongated generally rectangular boxlike enclosure, more particularly, an adaptation characterized by a firm horizontal bottom wall which serves as a satisfactory support and floor, a horizontal top wall above and in alignment with the underlying bottom wall and which constitutes a satisfactory roof, said top and bottom walls being interconnected by opposed left and right vertical sidewalls and a transverse end wall which provides the closed rear end of the storing space. This enclosure is open at the front, that is, the entrance-exit end. A swingable panel serves as the garage door and spans and closes the entrance-exit end and normally assumes an outwardly and downwardly sloping position. Means is fixedly mounted atop the interior of the bottom wall for reliably piloting, guiding and centering the automobile when it is compactly enclosed within the limited confines of the garage. The panellike main door has an upper marginal edge hingedly joined to a front transverse edge of the top wall. The front terminal ends of the sidewalls are inclined downwardly at the desired angle and the door, which is gravity lowerable, slopes forwardly and downwardly when closed. Openings are provided in the respective sidewalls and are normally closed by auxiliary side doors. These side doors are slidingly mounted and linkage means is provided between the main garage door and both side doors so that these several doors operate simultaneously. Actuating linkage is also provided and is controllable by handcranks from the forward ends of the opposite sides to bring about the simultaneous opening and closing movements of the main and auxiliary doors. The piloting and centering means embodies rails which safeguard driving in and backing out of the garage. The forward end portions of the rails are extended and braced to provide novel bracket means. This bracket means in turn is provided with a hitch-type coupling which is connectable with a towing vehicle.

Further novelty is predicated on the idea of providing minimal portions of the trackways to the left and right of the guide rails with suitable openings. These openings are normally closed by panels and when these panels are removed the openings serve to accommodate insertable and removable dolly-type wheels. The wheels are equipped with axles and brackets and can be attached and detached depending on whether the garage is to be stationed firmly atop the ground for a period of time or is to be elevated and moved within the area of the campsite or along a highway for such purposes as may be desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a portable garage constructed in accordance with the principles of the invention with the transporting dolly wheels omitted and with the structure supported flatwise on a ground or other surface and with the front and side doors closed.

FIG. 2 is a view also in perspective based on FIG. 1 and showing the main front door lifted up to an open position and one of the side doors wholly open.

FIG. 3 is a central longitudinal sectional view taken approximately on the plane of the section line 3—3 of FIG. 1, looking in the direction of the indicating arrows.

FIG. 4 is a transverse section, that is a view at right angles and taken approximately on the line 4—4 of FIG. 1 and appropriately enlarged.

FIG. 5 is a diagrammatic view showing the linkage means, generally stated, and showing both sliding auxiliary side doors and front or main garage door in phantom lines.

FIG. 6 is a fragmentary detailed view with parts in section and elevation and showing one of the transporting dolly wheels and how it is inserted when desired for use and bracketed in place.

FIG. 7 is a view in side elevation showing the garage with the transporting or dolly wheels attached and with the towing bracket hitched by coupling means to a towing vehicle.

With respect now to the elongated portable trailer-type garage this is designated, generally stated, by the numeral 10. It is made of appropriate lightweight but sturdy material which lends itself to outdoors use and traveling from place to place and along highways as the case may be. The elongated flat bottom wall is denoted by the numeral 12, the opposed parallel relatively short top wall is denoted at 14. The bottom wall provides a suitable floor and the top wall an appropriate roof. The opposed longitudinal sidewalls at the left and right are identical in construction and each wall is designated by the numeral 16. The fixed transverse vertical end wall is denoted at 18. All of the walls are appropriately connected to provide a sturdy enclosure. In practice it is preferred that the entire interior of this walled enclosure be stabilized by frame means, that is upper and lower longitudinal and transverse angle irons, the longitudinal angle irons being denoted in FIG. 4 by the numeral 20 and the transverse angle irons at 22. Thus by properly interconnecting and arranging the angle irons at the coacting corner portions of the walls a stabilizing framework is provided within the confines of the storing space for the automobile orother vehicle. It will be seen that the right hand or forward ends of the sidewalls are inclined downwardly as at 24 as perhaps best shown in FIG. 2. The front rectangular panellike wall provides the main garage door 26. The upper transverse edge is suitably hinged as at 28 on the forward end of the top wall 14. This door spans the open front and serves as a gravity lowerable readily openable and closable garage door. The lower marginal edge 30 is provided with notches 32 which provide clearance needs to be hereinafter referred to. This main or front door 26 is oriented and coordinated with left and right substantially rectangular auxiliary side doors 34. These side doors are slidingly mounted in tracks provided therefor. The tracks are simple strip members 36 which are arranged to cooperate with the coacting angle irons thus providing appropriate slideways or tracks for the sliding doors (each designated by the numeral 34) whether on the right-hand or left-hand side as evident in FIG. 4. These side doors serve to open and close side entrance openings 38. One of the features of the invention as already stressed is that wherein the several doors 26 and 34 are simultaneously openable and closable. In addition to the track means for the upper and lower edges of the side doors (FIG. 3) it will be evident that additional vertical struts are provided as at 40 whereby to make sure that the side doors operate smoothly and in conjunction with the main door 26. Push-pull linkage means is provided and is designated at 41 in FIG. 3 and comprises a front long link 42 which has an end 44 connected with the hinged edge portion of the door 26 and is provided with a reinforcing brace at 46 between itself and the door. The inward or left-hand end of the link 42 is pivotally connected as at 48 to a companion shorter link 50 which in turn is pivotally connected at 52 to an edge portion of the coacting sliding door 34. It follows that when the door 26 is up and open (as shown in FIG. 2) the linkage means 41 serves to slide the two side doors 34 to an open position (FIG. 2). Assuming that the automobile has pulled into the garage (whether backed in or driven in head-first) it will be evident that whichever door 34 is most convenient is then open so that the driver can simply step out of the automobile and also out of the garage. The means for operating or actuating the linkage means 41 comprises a pair of operating arms one of which is denoted at 54 (FIG. 3) and the other one at 56. These links are hinged together at 58. The link 56 is provided with a crank which extends through a bearing hole provided therefor as at 60 and which terminates in an appropriate grip-equipped crank handle 62. By turning the crank handle the arms 56 and 54 are operated and they in turn serve to operate the linkage means 41.

In addition to the linkage devices and operating arms and hand-operated cranks and openable and closable main and auxiliary doors the invention further includes an improvement in a pair of elongated spaced parallel angle irons 64 which are coplanar and spaced-apart in parallel relationship and fixed atop the median part of the floor or bottom wall 12. These angle irons 64 are spaced inwardly from the sidewalls 16 and provide trackways which are denoted at 66 and which serve to guidingly track the wheels of the automobile or car when either driven into the garage or backed out, as the case may be. It will be noted that the right-hand or forward end portions 68 of these rails project beyond the entrance and are terminally joined together by a substantially V-shaped member 70. This extending part of the structure constitutes a hitching or coupling bracket which is denoted generally at 72. This bracket means is stabilized by a plurality of coacting braces which are denoted conveniently at 74, 76 and 78, respectively. The vertex portion of the V-shaped connector 70 is provided with a coupling 80 and which in practice is adapted to be connected with a companion hitching or coupling device 82 as shown in FIG. 7, and which is carried by the trailing end of the towing car or vehicle 84.

Attention is also directed to the insertable and removable floor sections or panels which are denoted at 86 and which are arranged in the median portions of the respective trackways. By removing the panel 86 (FIG. 2) an opening 88 is provided (as shown in FIG. 6) which serves to accommodate the insertable and removable dolly wheel. This wheel means is designated generally by the numeral 90 and comprises (FIG. 6) the wheel 92, an axle 94 and an attaching or adaptable bracket 96 which is bolted in place as at 98. It is believed that it will be evident that normally the garage is seated firmly atop the ground or other surface as brought out in FIG. 1. When one desires to enter the garage the hand cranks 62 either to the left or right or turned from the position shown in FIG. 1 where the doors 26 and 34 are closed to the down position shown in FIG. 2. In the latter position the linkage means comes into play to simultaneously open the main garage door 26 and the side doors 34 and with the car in the garage it is evident that with the side doors 34 open the driver simply steps out and is then outside the confining limits of the garage. When it is desired to elevate and move the garage the panels or plates 86 are removed to provide the openings 88 whereupon the dolly wheel means 90 is installed and thus brought into play. Then the device can be hitched to the towing vehicle as brought out in FIG. 7 and transported from place to place in a self-evident manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A portable garage comprising an elongated automobile enclosure characterized by a horizontal bottom wall providing a floor, a horizontal top wall providing a roof, opposed left and right vertical sidewalls interposed between and connecting said bottom and top wall, a transverse end wall providing a rear wall, said enclosure being open at the front entrance-exit end, a garage door spanning and closing said entrance-exit end, means fixedly mounted atop the interior of said bottom wall for piloting, guiding and centering an automobile when it is housed within the confines of said garage, at least one of said sidewalls having a median portion provided with an opening of a size and shape defining a doorway, a vertically disposed side door horizontally slidingly mounted on an interior of said one sidewall and normally spanning and closing said doorway, linkage means located on the interior of said one sidewall and operatively connecting said garage door and side door together for simultaneous operation whereby when the garage door is moved to an open position the side door is simultaneously moved to an open position and vice versa.

2. The structure defined in and according to claim 1 and, in combination, said one sidewall having a bearing, a crank having a component portion mounted for operation in said bearing, motion transmitting arm means situated on an interior side of said one sidewall and operatively connected with said linkage means and crank, respectively, said crank having an operating end projecting to an exterior of said sidewall and provided with an accessible handgrip for convenient actuation.

3. The portable garage defined in and according to claim 2 and wherein said first named means comprises a pair of spaced parallel coplanar angle irons, said angle irons being coextensive with the length of said bottom wall and being spaced inwardly a predetermined distance from the respectively adjacent interior surfaces of said sidewalls and cooperating with the latter in providing trackways for the wheels of the aforemention automobile.

4. The portable garage defined in and according to claim 3, and wherein the forward end portions of said angle irons are of a length to project a limited distance beyond the forward transverse edge of said bottom wall, said angle irons having terminal portions joined by a V-shaped member, the vertex portion of said V-shaped member being centrally located and aligned with a central longitudinal portion of said open front and adapted to assist one in lining up his automobile prior to approaching said entrance-exit end.

5. A portable garage comprising an elongated automobile enclosure embodying a horizontal bottom wall providing a floor and adapted to reside flatwise on a stationary support surface, a horizontal top wall above and cooperating with said bottom wall and providing a roof, opposed left and right vertical sidewalls interposed between and cooperatively connecting said bottom and top walls, a transverse end wall marginally affixed to the top, bottom and sidewalls and providing a rear wall, said enclosure being open at its front and defining an entrance-exit end, an openable and closable garage door spanning and normally closing said entrance-exit end, spaced parallel coplanar angle irons fixed mounted atop the interior of said bottom wall and cooperating therewith and said sidewalls in defining a pair of trackways, said trackways being adapted to pilot, guide and center the wheels of an automobile when said automobile is driven into and housed within the confines of said garage, opposed median portions of the respective sidewalls being provided with vertically elongated openings, said openings being of a size and shape that they define selectively usable doorways, vertically disposed side doors horizontally slidingly mounted on interior portions of the respective sidewalls and normally spanning and closing their respectively cooperable doorways, and linkage means operatively mounted on cooperating interior surfaces of the sidewalls and operatively connecting said garage door and side doors for simultaneous operation, whereby when said garage door is intentionally moved to an open position the complemental side doors are simultaneously and conjointly moved to open positions.